April 9, 1963  A. P. FREITAS ET AL  3,084,952
VEHICLE PNEUMATIC SUSPENSION SYSTEM
Filed Nov. 19, 1959  2 Sheets-Sheet 1

INVENTORS.
GRENVILLE C. STONE,
ANTHONY P. FREITAS,
BY
Eric A. Rose
ATTORNEY.

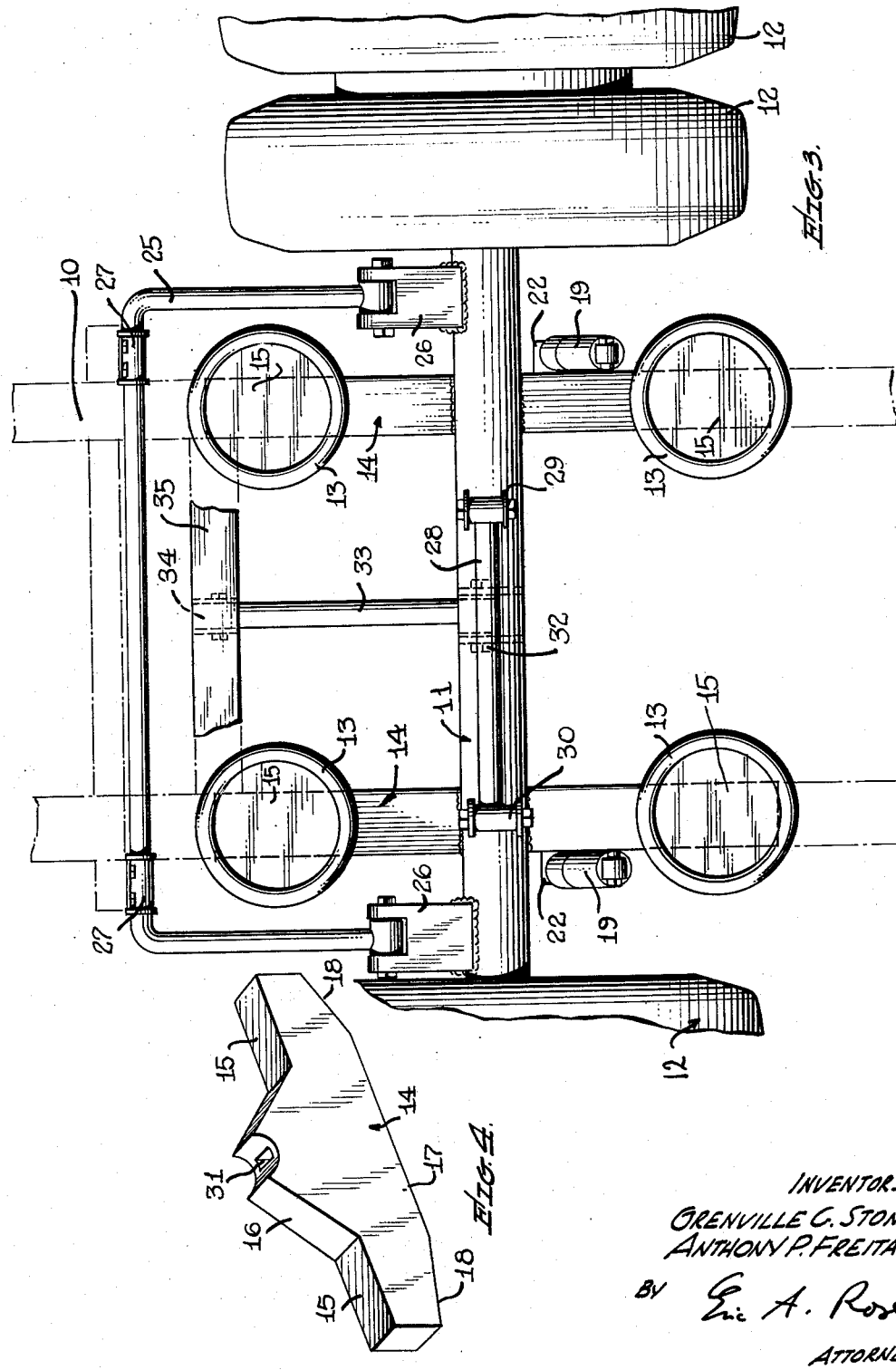

United States Patent Office 3,084,952
Patented Apr. 9, 1963

3,084,952
VEHICLE PNEUMATIC SUSPENSION SYSTEM
Anthony P. Freitas, 8476 Chestnut Ave., South Gate, Calif., and Grenville C. Stone, 1801 McMillan St., Compton, Calif.
Filed Nov. 19, 1959, Ser. No. 854,141
1 Claim. (Cl. 280—112)

Our invention relates to improvements in vehicle suspensions, and particularly to pneumatic type suspension of vehicles upon the axle thereof; and the objects of our invention are, first, to provide a low mount suspension of the pneumatic type of a vehicular frame, which suspension, while resilient, will not affect detrimentally the stability of the body of the vehicle either laterally or longitudinally; second, to provide a vehicular suspension of the pneumatic type employing a pontoon shaped bracket arrangement affixed to the axle of the vehicle for the symmetrical mounting of a plurality of pneumatic suspension means about the axle; third, to provide a pontoon shaped suspension arrangement in connection with a vehicle suspension employing pneumatic structures supporting the body of the vehicle upon the axles thereof, in which such pneumatic structures are arranged between said pontoon shaped bracket and said vehicular body in such a manner as to result in the low mounting of the body upon the axles of the vehicle; fourth, to provide an arrangement of the pneumatic type suspension of a vehicular frame or body upon the axles of a vehicle permitting the resilient low mounting of the frame or body without detrimental effect on its relative stability.

We attain these and other objects by means of the construction and arrangement illustrated in the accompanying drawings, in which—

Figure 1:
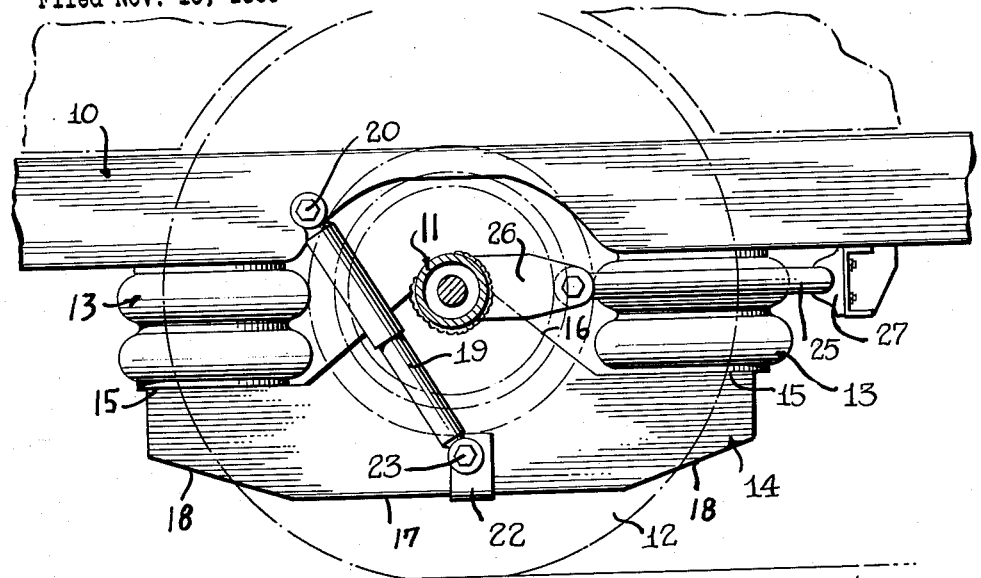
Figure 2:
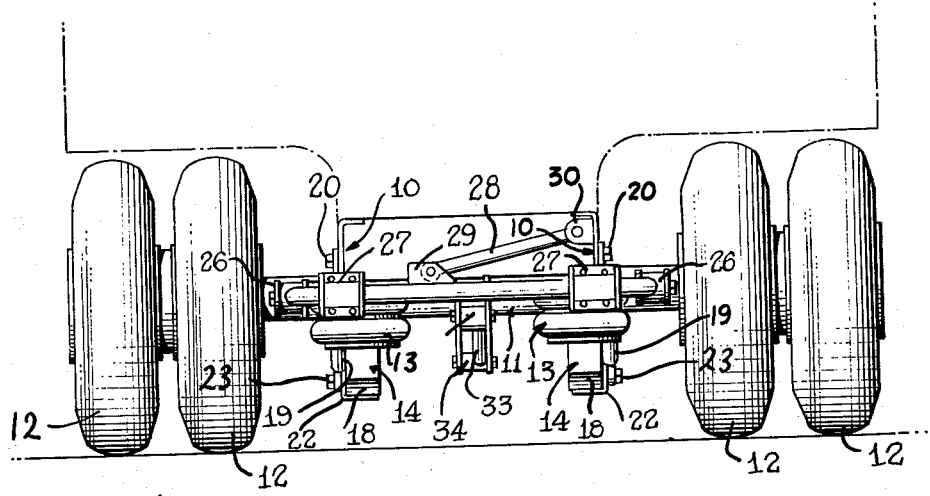

FIGURE 1 is a side elevation of our suspension system;
FIGURE 2 is a rear elevation of our invention;
FIGURE 3 is a plan view of our invention; and
FIGURE 4 is a view in the perspective of the pontoon shaped structure employed in this embodiment of our invention.

Similar parts throughout the several views are designated by similar numerals.

Referring to the drawings accompanying the specification, our vehicle suspension system comprises generally a combination of pneumatic structures and arrangements supporting the frame or body of the vehicle upon the axles thereof, and means for assuring lateral and longitudinal stability of the vehicular frame or body by mechanical means such as torsion bars and hydraulic type shock absorbers.

As illustrated in the accompanying drawings, the pneumatic type suspension system comprises a vehicular frame, 10, resiliently supported upon the axle housing, 11, carried by wheels, 12, through the use of four pneumatic type suspension devices, 13, two of them being positioned on each side of the chassis frame one forwardly and one rearwardly of the axle housing, 11. The pneumatic type suspension devices, 13, are well known to the art and comprise bellows into which airflow is controlled by suitable load responsive delayed action valve means from a reservoir to provide a cushioning effect when loads are applied upon said bellows.

The two pneumatic suspension devices positioned forwardly and rearwardly of the axle housing respectively on each side of the frame are mounted on a bracket, 14, shown in the illustrated drawings of pontoon shape.

The top portion of the bracket comprises level end portions, 15, and a raised medial portion, 16, rigidly affixed to the axle housing, 11, adjacent to the inner wheel, 12, of a dual wheel assembly. The bottom portion of the bracket is substantially pontoon shaped, that is, it comprises a substantially horizontal medial portion, 17, and upwardly slanted end portions, 18, which end portions are positioned under the level end portions, 15, of the top portion of the bracket, 14. The level end portions, 15, each providing support for a pneumatic type suspension device, which is thus fitted and positioned between each level end portion, 15, of the top of the bracket, 14, and the bottom of the frame, 10.

A hydraulic type shock absorber, 19, is attached to the outside of the frame, 10, and to the outside of the bracket, 14, the top end of the shock absorber, 19, is rotatably affixed to the frame, 10, by means of a bolt, 20, welded to the frame, 10, and the lower portion of the shock absorber, 19, is secured to the bracket, 14, by means of an extension member, 22, rigidly affixed to the medial portion of the bottom portion thereof, by means of a bolt, 23.

For the purpose of controlling torque and to provide for the stability of the vehicular frame or body, 10, a U-shaped torsion bar, 25, is pivotally attached between the underside of the frame, 10, and the axle housing, 11, the ends of the U-shaped torsion bar being hinged in extension brackets, 26, welded to the axle housing, 11, outside of the attachment of the bracket, 14, supporting the pneumatic suspension devices, 13, to the axle housing, 11, and the horizontal portion of the torsion bar, 25, extending through sleeves, 27, rigidly secured to the underside of the vehicle frame, 10. A torque rod, 28, is pivotally suspended between a hinge, 29, welded to the medial portion of the axle housing, 11, and a hinge, 30, rigidly secured to the inside of the vehicular frame or body, 10.

An additional torque bar, 33, extends along the longitudinal center line of the frame, 10, and is pivotally attached to the underside, 32, of the axle housing and to a hinge, 34, secured to a transverse member, 35, affixed to the frame, 10.

The pontoon shaped bracket, 14, may be fabricated of sheet steel, and a slot, 31, may be provided in the raised medial top portion of the bracket, 14, to facilitate the welding of the bracket, 14, to the axle housing, 11.

While specific forms of our invention have been described, it is understood that the same may be modified without departing from the spirit of our invention as defined in the appended claim.

We claim:

In an automotive vehicle, the combination of: a frame having a pair of longitudinal side members and a transverse frame member extending between said side members; an axle extending transversely across said frame; a pontoon-shaped bracket disposed parallel with and spaced below each of said frame side members, said axle being spaced longitudinally from said transverse frame member and secured to the upper mid-portion of each of said brackets so as to be supported by said brackets; four pneumatic type suspension devices, said devices being operatively interposed between the front and rear ends of said brackets and the underside of said frame side members; a horizontally extending, generally U-shaped torsion bar having its opposite ends pivotally secured to the opposite sides of said axle outwardly of said suspension devices and its intermediate portion pivotally connected to said frame side members; a transversely extending downwardly inclined torque rod having its lower end pivotally connected to the intermediate portion of said axle and its upper end pivotally connected to said frame, said torque rod overlying said axle and being parallel therewith; a shock absorber extending between each of said brackets and the frame side member disposed thereabove; a second torque bar extending along the longitudinal center line of said frame having its lower end pivotally attached to the center of said axle and its upper end attached to said transverse frame member; and wheel means on the opposite sides of said axle outwardly of said torsion bar.

References Cited in the file of this patent

UNITED STATES PATENTS

| | | |
|---|---|---|
| 2,901,240 | Fikse | Aug. 25, 1959 |
| 2,902,291 | Walker | Sept. 1, 1959 |
| 2,970,848 | Rice | Feb. 7, 1961 |

OTHER REFERENCES

German printed publication, 1,046,510, Dec. 11, 1958, D 24349 II/63C.